United States Patent [19]

Hineborg et al.

[11] 4,287,648
[45] Sep. 8, 1981

[54] TIRE BUFFING BLADE

[75] Inventors: James R. Hineborg, Santa Ana; Efrain Lopez, Pasadena, both of Calif.

[73] Assignee: AMF Incorporated, White Plains, N.Y.

[21] Appl. No.: 133,699

[22] Filed: Mar. 24, 1980

[51] Int. Cl.³ .................... B23D 71/00; B21K 21/00; B29H 21/08
[52] U.S. Cl. ............................... 29/79; 76/101 SM; 157/13
[58] Field of Search ............... 29/78, 79; 76/101 SM; 157/13

[56] References Cited

U.S. PATENT DOCUMENTS

| | | | |
|---|---|---|---|
| 2,896,309 | 7/1959 | Jensen | 29/79 |
| 3,102,325 | 9/1963 | Hemmeter | 29/79 |
| 3,351,997 | 11/1967 | Neilsen | 29/79 |
| 3,680,185 | 8/1972 | Wood | 29/79 |
| 4,021,899 | 5/1977 | Jensen | 29/79 |
| 4,059,875 | 11/1977 | Jensen | 29/78 |
| 4,091,516 | 5/1978 | Jensen et al. | 29/79 |

FOREIGN PATENT DOCUMENTS

| | | |
|---|---|---|
| 139990 | 9/1969 | Italy . |
| 147963 | 9/1970 | Italy . |
| 766960 | 1/1957 | United Kingdom . |

Primary Examiner—Harrison L. Hinson
Attorney, Agent, or Firm—George W. Price; Charles J. Worth

[57] ABSTRACT

A bidirectional buffing blade for tire rasps with cutting and dragging teeth of the same configuration with reduced drag, improved heat transfer and cutting teeth with a substantially constant radial rake angle and land width which does not change with wear.

14 Claims, 4 Drawing Figures

TIRE BUFFING BLADE

This invention relates generally to tire rasps or the like which are used to prepare a tire carcass for recapping or retreading, and more particularly, to replaceable blades therefor.

It has become substantially normal practice to use a tire rasp comprising a hub with replaceable buffing blades to remove tread rubber from a used tire carcass for preparing a suitable surface to which new tread rubber adheres. Numerous blades with varied working profiles have been proposed with the intent to provide longer blade life, more rapid stripping of the old tread rubber, and more suitably prepared surfaces. Such blade profiles range from simplistic saw tooth-like arrangements with substantially short useful lives to highly complex configurations which in many instances generate excessive heat due to friction, tend to gouge the surface being prepared or result in a surface with varying characteristics due to changing rake angles as the teeth wear from use.

Accordingly, an object of the present invention is to provide an improved buffing blade with a bidirectional profile permitting either blade end to be the leading end when the blade is mounted in the hub of a tire rasp.

Another object of the present invention is to provide the foregoing blade with teeth having a substantially constant radial rake angle which does not change as the teeth wear from use.

Another object of the present invention is to provide the foregoing buffing blade with teeth not readily subject to breakage.

And another object of the present invention is to provide the foregoing buffing blade with a tooth configuration which generates less than normal heat due to friction and provides a good heat transfer path.

The foregoing and other objects and advantages will appear more fully hereinafter from a consideration of the detailed description which follows, taken together with the accompanying drawings wherein a single embodiment of the invention is illustrated by way of example. It is to be expressly understood, however, that the drawings are for illustration purposes only and are not to be construed as defining the limits of the invention.

Figure 1:
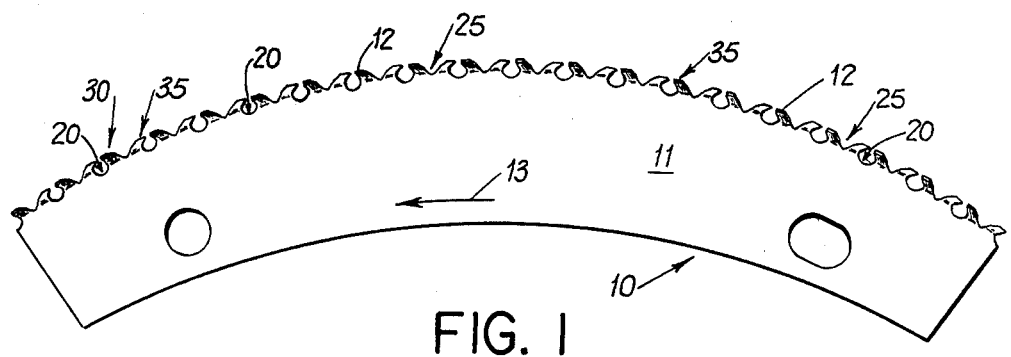
FIG. 1 is an elevational view of a buffing blade made in accordance with the present invention.

Referring now to the drawings, a blade in accordance with the present invention is stamped or otherwise formed of sheet metal having a flat body 11 with the usual mounting holes and a convex working edge 12. The working edge 12 is interrupted by a series of equally spaced, primary cutouts 20 separating pairs of cutting and dragging teeth 30 and 35 from adjacent pairs of teeth, and by a series of equally spaced V-shaped cutouts 25 each equally spaced between the primary cutouts and separating a tooth 30 from the adjacent dragging tooth 35. The blade 10 is described herein as being rotatable in a counter clockwise direction as shown by the arrow 13.

Each of the primary cutouts 20 has a pair of spaced straight sides 21 and 22, which intersect the working edge 12 at 31 and 36 respectively, and diverge as they extend away from the working edge 12. The sides 21 and 22 form the leading edge of a cutting tooth 30 and the trailing edge of the preceding dragging tooth 35, and are connected together by an arcuate edge 23 defining the enlarged bottom of the cutout. Line 45 is a line radial to the arc of the working edge through point 31 on the cutting tooth tip. The edge 21 intersects the radial line 45 at an angle $\alpha$ which is called the radial rake angle of the cutting tooth. The radial rake angle $\alpha$ preferably is within the range of 40 to 50 degrees, and has been found particularly satisfactory at about 45 degrees. As the apex of the radial rake angle $\alpha$ for the cutting tooth 30 points in the direction of rotation, it is said to be of positive rake. The edge 22 also intersects the radial line 46 through the point 36 at the same angle $\alpha$. As the apex of the radial rake angle $\alpha$ for the dragging tooth 35 points away from the direction of rotation, it is said to be of negative rake.

The shape of the bottom surface 23 of the primary cutout is established by balancing the desire for a deep cut, with minimum stress concentration and a wide root for strength and heat transfer from the tooth. Applicants have found that a favorable balance of those considerations is achieved with the curvature of the surface 23 being a compound arc preferably formed by the major arc of an ellipse connected by the minor arcs of the ellipse to the straight edges 21 and 22. The straight edges 21 and 22 join the curved surface 23 at tangency points 15 and 16 respectively.

Each of the secondary cutouts 25 has a pair of straight converging sides 26 and 28 which intersect at the bottom of the secondary cutout. Preferably, a fillet 39 is provided at the intersection. The side 26 which forms the trailing edge of a cutting tooth 30 is substantially parallel to its front edge 21 of the tooth and has a relieved or cut back outer portion 27 which intersects the working edge 12 at 32. The edge 28 which forms the leading edge of a dragging tooth 35 is substantially parallel to its trailing edge 22 and has a relieved or cut back outer portion 29 which intersects the working edge 12 at 37.

The working edge 12 forming the outer edges of teeth 30 and 35 comprises a series of lands 40 and 41 which are concentric with the center of rotation of the blade. These lands 40 and 41 are reduced in length by the reliefs 27 and 29 thereby reducing the frictional drag and heat at the ends of the teeth. These reliefs also reduce the angle at which the dragging tooth strikes the tire which applicant's define as the tangential relief $\beta$, i.e., the angle between the tangent at point 37 and the relief surface 29.

The roots 42 and 43 of the teeth are those portions below the reliefs 27 and 29 and the tangency points 15 and 16. The roots have a substantial thickness t for strength. The reliefs 29 also reduce the angle at 37 at which the dragging teeth 35 strike the tire thereby allowing the teeth to move over the previously buffed surface with less resistance.

Because the edge 21 is straight, the radial rake angle $\alpha$ remains substantially constant as the tooth 30 wears down in use. In addition, as the dragging teeth wear the relief 29 and the width of the land 40 will be essentially maintained because rubbing of the relief 29 on the tire will cause the relief to be continuously re-newed moving down along the edge 28 as the tooth wears down.

The secondary cutouts 25 are of lesser depth than the primary cutouts 20. The resulting teeth are somewhat short and stubby for strength and with the compound arcuate shape of the bottom of the primary cutouts provide strengthened tooth roots 42 and 43. The roots 42 and 43 being wider than the teeth 30 and 35 also provide an improved heat transfer path from the teeth to the body.

Figure 3:
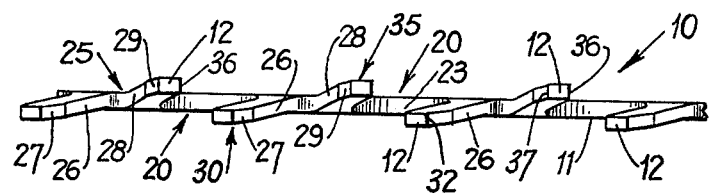
FIGS. 3 and 4 are plan and end elevational views of the blade end of FIG. 2.
Figures 2, 4:
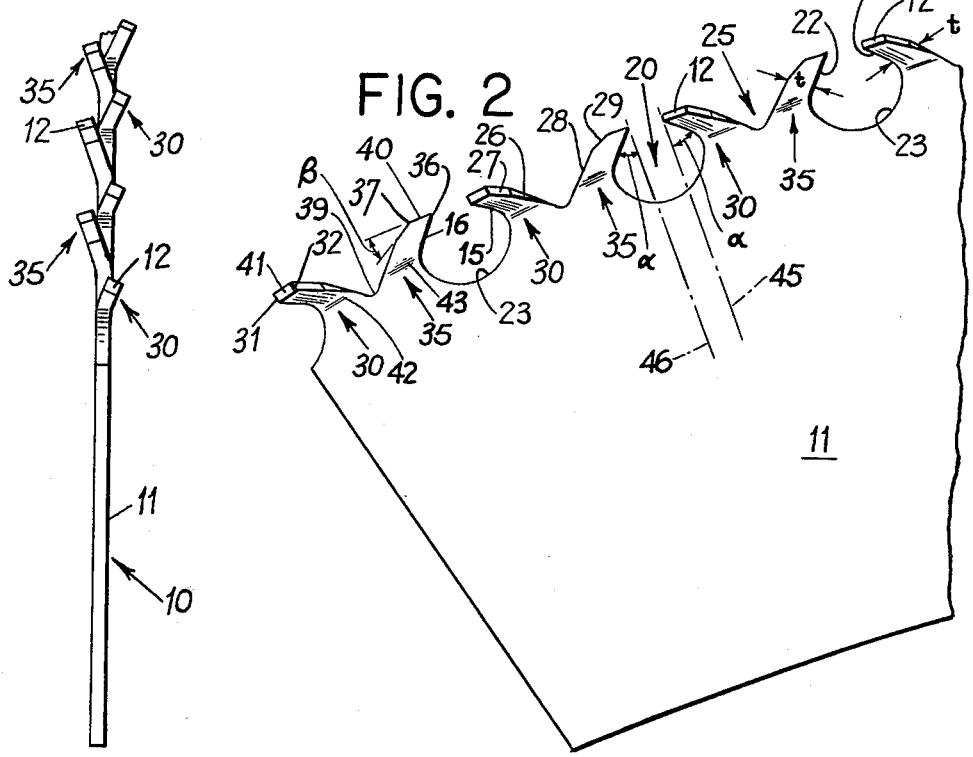
FIG. 2 is an enlarged elevational view of one end of the blade of FIG. 1.

As best shown in FIGS. 3 and 4, all of the cutting teeth 30 are bent or offset laterally in the same direction out of the normal plane of blade 10 an amount preferably equal to the thickness of the blade body. Similarly, all of the dragging teeth 35 are bent or offset laterally an equal amount but in the direction opposite from the cutting teeth 30.

It should be readily seen that if the blade 10 of FIG. 1 is rotated 180 degrees so that the trailing end at the right hand side of the drawing becomes the leading blade end, cutting teeth 30 now become the dragging teeth and the dragging teeth 35 now become the cutting teeth. Since the teeth 30 and 35 are mirror-images having the same configuration, and cutouts 20 and 25 are symmetrical, the operation of the blade 10 is the same regardless of which blade end is the leading or trailing blade end.

While various surfaces such as 12, 21, 22, 26, 27, 28 and 29 have been described as edges, it is apparent from the drawings that they each have a thickness equal to the blade thickness and therefore are not sharp edges.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A buffing blade adapted for mounting in a tire rasp, comprising:
    a flat planar body with a plurality of pairs of cutting and dragging teeth defining an interrupted convex working edge, and said teeth having a substantially constant radial rake angle which remains unchanged during wear of said teeth;
    each of said teeth have straight leading and trailing edges substantially parallel to one another;
    a series of primary cutouts separating pairs of cutting and dragging teeth each having a pair of straight diverging sides defined by the trailing edge of a dragging tooth and the leading edge of the following cutting tooth extending from the working edge to the bottom of the primary cutout defining a complex arc;
    said teeth having enlarged root portions and said primary cutouts extending below said root portions providing a heat transfer path from said root portions of each of said pairs of teeth to said planar body between successive cutouts;
    a V-shaped cutout between each pair of cutting and dragging teeth having converging sides extending from said working edge to the bottom of said slot defined by the trailing edge of said cutting tooth and the leading edge of said dragging tooth;
    said cutting teeth all being laterally offset in the same direction from the plane of said body a distance substantially equal to the thickness of said blade; and
    said dragging teeth all being laterally offset from the plane of said body a distance substantially equal to the thickness of said blade and in a direction opposite from said cutting teeth.

2. A blade in accordance with claim 1, and
    the outer ends of the trailing edges of said cutting teeth being relieved or cut back thereby reducing frictional drag and heat at the working edges thereof.

3. A blade in accordance with claim 1, and
    a relief on the leading edge of each dragging tooth near the working edge reducing the tangential relief angle and the width of the working edge thereof.

4. The buffing blade in accordance with claim 1, and
    the outer ends of the trailing edges of said cutting teeth and the leading edges of said dragging teeth being relieved or cut back thereby reducing frictional drag and heat at the outer ends of said teeth, and reducing the angle of the leading edges at the outer ends of said dragging teeth.

5. A buffing blade adapted for mounting in a rotating tire rasp, comprising:
    a flat planar body having a convex arcuate working edge;
    a series of cutouts defining cutting teeth of positive rake and dragging teeth of negative rake;
    each of said teeth having substantially parallel leading and trailing edges; and
    a relief portion on the leading edge of the dragging teeth adjacent to the working edge to reduce the tangential relief angle and the width of the dragging tooth working edge.

6. A blade in accordance with claim 5 and further comprising:
    the cutting teeth and the dragging teeth being mirror-images so that the blade may be reversed.

7. A buffing blade adapted for mounting in a rotating tire rasp, comprising:
    a flat planar body having a convex arcuate working edge;
    a series of primary cutouts interrupting said working edge and each having an arcuate bottom;
    a secondary cutout interrupting said working edge between each adjacent two primary cutouts, said secondary cutouts being substantially less deep than said primary cutouts;
    each two adjacent primary cutouts defining therebetween a pair of teeth separated from each other by the intervening secondary cutout, one tooth of said pair being a cutting tooth and the other being a dragging tooth; and
    each cutting tooth having an arcuate land at the working edge, a substantially straight leading edge to maintain a substantially constant rake angle as said tooth wears, and
    a substantially straight trailing edge generally parallel to its leading edge.

8. A blade in accordance with claim 7, and
    the outer ends of the trailing edges of said cutting teeth being relieved or cut back thereby reducing frictional drag and heat at the working edges thereof.

9. A blade in accordance with claim 7, and
    a relief on the leading edge of each dragging tooth near the working edge reducing the tangential relief angle and the width of the working edge thereof.

10. The buffing blade in accordance with claim 7, and
    the outer ends of the trailing edges of said cutting teeth and the leading edges of said dragging teeth being relieved or cut back thereby reducing frictional drag and heat at the outer ends of said teeth, and reducing the angle of the leading edges at the outer ends of said dragging teeth.

11. A blade as defined in claim 7 and further comprising:
said cutting teeth all being laterally offset in the same direction from the plane of said body a distance substantially equal to the thickness of said blade; and
said dragging teeth all being laterally offset from the plane of said body a distance substantially equal to the thickness of said blade and in a direction opposite from said cutting teeth.

12. A blade as defined in claim 7 and further comprising:
each dragging tooth being an opposite mirror-image of each cutting tooth so that said blade operates the same when reversed end-for-end.

13. A buffing blade adapted for mounting in a rotating tire rasp, comprising:
a flat planar body having a convex arcuate working edge;
a series of primary cutouts interrupting said working edge each primary cutout having
a pair of diverging straight edges defining the leading edge of a cutting tooth and the trailing edge of a dragging tooth respectively, and
a concave arcuate bottom connecting the lower ends of said straight edges;
a series of V-shaped secondary cutouts interrupting said working edge, alternating with said primary cutouts to define the trailing edge of a cutting tooth and the leading edge of a dragging tooth respectively, said secondary cutouts extending to a depth substantially less than the arcuate bottoms of the primary cutouts;
the sides of said V-shaped secondary cutouts being straight and each being generally parallel to the adjacent straight side portion of the adjacent primary cutout; and
relieved areas on the leading edge of each dragging tooth and the trailing edge of each cutting tooth to reduce the width of the tooth tip relative to its root.

14. A blade in accordance with claim 13 and further comprising:
said cutting teeth all being laterally offset in the same direction from the plane of said body a distance substantially equal to the thickness of said blade; and
said dragging teeth all being laterally offset from the plane of said body a distance substantially equal to the thickness of said blade and in a direction opposite from said cutting teeth.

* * * * *